United States Patent [19]

Biedermann

[11] Patent Number: 4,713,043
[45] Date of Patent: Dec. 15, 1987

[54] CHAIN TENSIONER

[75] Inventor: Adam Biedermann, Puchheim, Fed. Rep. of Germany

[73] Assignee: Joh. Winklhofer & Söhne, Munich, Fed. Rep. of Germany

[21] Appl. No.: 833,346

[22] Filed: Feb. 25, 1986

[30] Foreign Application Priority Data

Feb. 26, 1985 [DE] Fed. Rep. of Germany ....... 3506770
Jul. 8, 1985 [DE] Fed. Rep. of Germany ....... 3524378

[51] Int. Cl.$^4$ .............................................. F16H 7/08
[52] U.S. Cl. .................................................. 474/111
[58] Field of Search ................................. 474/111, 112

[56] References Cited

U.S. PATENT DOCUMENTS

| 2,963,918 | 12/1960 | Blakstad | 474/111 |
| 3,455,178 | 7/1969 | Ruoff et al. | 474/111 |
| 3,626,776 | 3/1971 | Staudinger et al. | |
| 4,395,251 | 7/1983 | King et al. | 474/111 |
| 4,543,079 | 9/1985 | Matsuda et al. | 474/111 |

FOREIGN PATENT DOCUMENTS

| 1080371 | 4/1960 | Fed. Rep. of Germany . |
| 494907 | 8/1970 | Fed. Rep. of Germany . |
| 1625883 | 8/1970 | Fed. Rep. of Germany . |
| 1650910 | 11/1970 | Fed. Rep. of Germany . |
| 1750986 | 4/1971 | Fed. Rep. of Germany . |
| 1775273 | 5/1971 | Fed. Rep. of Germany . |
| 2525352 | 12/1976 | Fed. Rep. of Germany . |
| 2934604 | 12/1981 | Fed. Rep. of Germany . |
| 1399934 | 9/1965 | France . |
| 1474011 | 1/1967 | France . |
| 2350518 | 2/1977 | France . |
| 511064 | 8/1939 | United Kingdom . |

Primary Examiner—Stephen J. Novosad
Assistant Examiner—William P. Neuder
Attorney, Agent, or Firm—Toren, McGeady & Associates

[57] ABSTRACT

In a chain tensioner (116) having a piston (120) displaceable in a guide housing (118) along its axis (134) and having a tensioner bar (124) articulated to the guide housing (118) with pressure of the piston head (122) upon the tensioner bar (124), in one of the two parts, piston head and tensioner bar, a guide groove (140) extending substantially parallel to the longitudinal direction of the tensioner bar is provided in which there engages a guide protuberance (piston head 122 flattened off on both sides) formed in each case on the other part. This results firstly in a securing of the tensioner bar against lateral pivoting and nextly in a securing of the piston against rotation.

18 Claims, 8 Drawing Figures

CHAIN TENSIONER

The invention relates to a chain tensioner having a piston displaceable in the direction of its axis in a guide housing and a tensioner bar articulated to the guide housing, on the inner side of which bar facing the guide housing the piston presses with a piston head.

Such a chain tensioner is known (for example Fed. German PS No. 1,625,883 and Fed. German Publ. Sp. No. 1,650,910). The tensioner bar is pressed by the piston against the chain, belt or the like to be tensioned in order to keep the chain, belt or the like under predetermined tension stress even in the case of its elongation. By reason of the large-area mutual abutment of tensioner bar and chain, belt or the like a substantially reduced wear occurs. By using the bar it is also possible, for a predetermined piston stroke, to compensate for a greater elongation of the chain, belt or the like. In the known chain tensioners the tensioner bar rests with its continuously flat inner side on the domed piston head. Now it has appeared that during use the tensioner bar can come into lateral vibrations (transversely of the piston axis of the piston abutting on the tensioner bar) by reason of corresponding vibrations of the chain, belt or the like, which can result in increased wear and possibly noise generation. The ratchet pawl (3) according to Fed. German Publ. Sp. No. 1,650,910 fitted laterally on the tensioner bar and co-operating with a toothing of the guide housing cannot prevent such vibrations.

The problem of the invention consists in reliably suppressing lateral vibrations of the tensioner bar with constructionally simple means in a chain tensioner of the initially stated kind.

This problem is solved in that on one of the two parts, piston head and tensioner bar, there is formed a guide groove extending substantially parallel with the longitudinal direction of the tensioner bar, in which groove there engages a guide protuberance formed on the other part. Thus the tensioner bar articulated at its one end to the guide housing is secured against transverse vibrations by the piston in the region of the piston, which is relatively remote from the articulation, while the appropriately oriented guide groove permits the piston head to slide along the guide bar inner side in the outward movement of the piston. Guide groove and guide protuberance can be produced simply for example by milling.

The external circumference of the piston head is preferably flattened off on at least one side with piston side face substantially parallel to the longitudinal direction of the tensioner bar and to the piston axis, which side face abuts on a groove side face of the tensioner bar. Securing of the piston in rotation in relation to the piston axis results, which is advantageous especially if the cylindrical piston is provided at its inner end with a bevel for the supply of oil under pressure and/or if the piston is provided with a row of teeth on one side for a ratchet in accordance with European Publication Specification No. 0,106,325, especially according to FIG. 48. Apart from that, the at least unilateral flattening of the piston head does not limit the possible installation length within the hollow piston for an initial-stressing spring, so that a favourable spring characteristic can be achieved with great spring length.

The tensioner bar is preferably pivotably mounted in a bearing fork formed on the guide housing, which results in increased bending resistance compared with unilateral securing.

For reasons of cost and weight the tensioner bar is preferably formed with synthetic plastics material.

Chain tensioners with non-return valve installed in an oil feed nipple are known per se (Fed. German Publ. Sp. No. 1,750,986). In assembly a cylindrical push-in section of the oil feed nipple is pushed into a corresponding oil feed opening of a chain tensioner carrier. Now it has appeared that in the case of high oil pressures, with assistance from vibrations occurring during operation, slackening of the oil feed nipple in the guide housing can occur which leads to a leakage in this region. In accordance with the invention this is prevented by the fact that the push-in section comprises at least one radial protuberance to abut on a chain tensioner fitting face, surrounding the oil feed opening, of the chain tensioner carrier. After fitting of the chain tensioner on the chain tensioner carrier the oil feed nipple is pressed against the chain tensioner fitting face and in this way it is clamped in between guide housing and chain tensioner carrier. Consequently the oil feed nipple can no longer slacken. The oil feed nipple in accordance with the invention can be produced at especially favourable cost if the at least one radial protuberance is formed by a circumferential collar of enlarged diameter of the push-in section. With this circumferential collar the oil feed nipple is clamped in between guide housing and chain tensioner carrier when the chain tensioner is fitted.

The circumferential collar preferably lies flush with a guide housing side face opposite to the chain tensioner fitting face. If after fitting has taken place the fitting face and the side face lie flat against one another, the desired clamping in of the oil feed nipple is guaranteed.

The oil feed nipple is preferably pressed into the guide housing so that with simple assembly a seal takes place between oil feed nipple and guide housing.

The invention also relates to a chain tensioner having a curved tensioner bar on the outside of which a chain rests on an abutment face which is formed with at least two rows of side bars extending in the longitudinal direction of the chain and connected with one another by bolts and sleeves extending in the transverse direction, each row being formed from side bars offset in mutually overlapping manner in the chain longitudinal direction, arranged immediately side-by-side in the transverse direction and articulatedly connected with one another.

In chain tensioners with tensioner shoe secured directly to the hollow piston it is known (Fed. German PS No. 1,775,273) to provide a single oil outlet opening in the abutment face of the tensioner shoe abutting on the roller chain. The issuing lubricant oil serves firstly for the lubrication of the abutment surface and thus to reduce the friction resistance between tensioner shoe and roller chain, and also for the lubrication of the roller chain itself. Accordingly it is known from Fed. German PS. No. 1,080,371 to supply lubricant oil to presser rollers rigidly connected with the hollow piston and abutting in each case on the side bar pairs. Finally Fed. German PS No. 2,525,352 shows a chain tensioner with an oil outlet nozzle on the hollow piston beneath the tensioner head, which sprays the roller chain with lubricant oil before it runs up on to the abutment face. The latter solution is not readily transferable to a chain tensioner with curved tensioner bar, apart from the only partial utilisation of the sprayed lubricants.

In a chain tensioner with curved tensioner bar a supply of lubricant oil with improved effectiveness is to be prepared with low constructional expense.

This is achieved in that a number of oil outlet openings corresponding to the number of rows of side bars is provided on the outside of the curved bar and each oil outlet opening lies opposite to a side bar row. The provision of the oil outlet openings on the curved tensioner bar requires no major constructional precautions. The clear distance between the oil outlet openings and the passing roller chain can be made so small that practically the whole of the oil comes on to the chain, but the chain does not come into contact with the oil outlet openings with the danger of depositing dirt or abraded materials which could lead to a blockage of the oil outlet openings. In the conventional chain lubrication with supply of lubricant oil through a single oil outlet opening it has appeared that a disproportionately large quantity of lubricant oil must be used for a satisfactory chain lubrication. It was recognised that this was due to the fact that the oil sprayed on to the chain approximately in the middle of the width arrives only with difficulty at the actual friction faces, namely between the bolts and the sleeves surrounding these. In the invention on the other hand the oil is conducted directly to the side bar pairs on both sides of the rollers, so that the oil can pass out of the gap formed between outer and inner side bars to directly between the bolt and sleeve. Since this oil supply takes place on both sides of the sleeves a reliable chain lubrication is obtained with relatively low utilisation of lubricant oil. Moreover those parts of the chain which abut on the abutment face, namely the side bars, are lubricated directly so that low-friction chain running takes place on the tensioner arm with low utilisation of oil.

The oil feed openings are preferably arranged in an area region which lies opposite to the joint plate before it reaches the abutment face, in order to guarantee low friction running in the entire region of the abutment face even though individual cases are conceivable where the oil outlet openings are arranged in the region of the abutment face, since even then reliable lubrication of the chain bolts and sleeves is guaranteed.

The oil supply to the oil outlet openings could take place through a hose or through a hollow bolt as pivot bearing point of the curved arm on the chain tensioner housing. Especially in the case of a chain tensioner hollow piston charged with oil under pressure to increase the outward thrust force and/or the vibration damping, the features of the oil openings arranged in the surface region of the tensioner bar opposite to the chain before it contacts the chain prove especially advantageous. A special oil supply is superfluous, in place of which it is merely necessary to provide the connection passage in the curved tensioner bar. This passage is preferably formed as a groove extending on the inner side of the curved tensioner bar, which reduces the production costs.

In cases of relatively low oil requirement this groove can be open, so that then, with appropriate orientation of the curved bar, the oil flows from the oil feed opening of the hollow piston to the two oil outlet openings under gravity (and/or by reason of appropriate capillary forces). In the case of a greater lubricant oil requirement the passage will however be preferably formed as a pressure passage so that the oil can be fed to the two oil outlet openings under appropriate pressure.

A relatively good sealing of the mutually opposite oil feed opening of the hollow piston and oil entry opening of the cover part to the exterior is ensured in order to keep the oil losses as small as possible. The widening of the oil entry opening in the longitudinal direction of the curved bar here ensures that the two openings overlap sufficiently in all possible positions of the hollow piston.

In order to keep the attenuation of the curved bar by the groove slight (especially in order that a synthetic plastics curved bar may be used without difficulty), a groove configuration is proposed.

The arrangement of the groove width in the region of the oil entry without further measures ensure a fixing of the cover part on the curved bar in addition to a lateral guidance of the curved bar on the hollow piston.

The invention will be explained below by means of preferred examples of embodiment with reference to the drawing, wherein.

Figure 1:
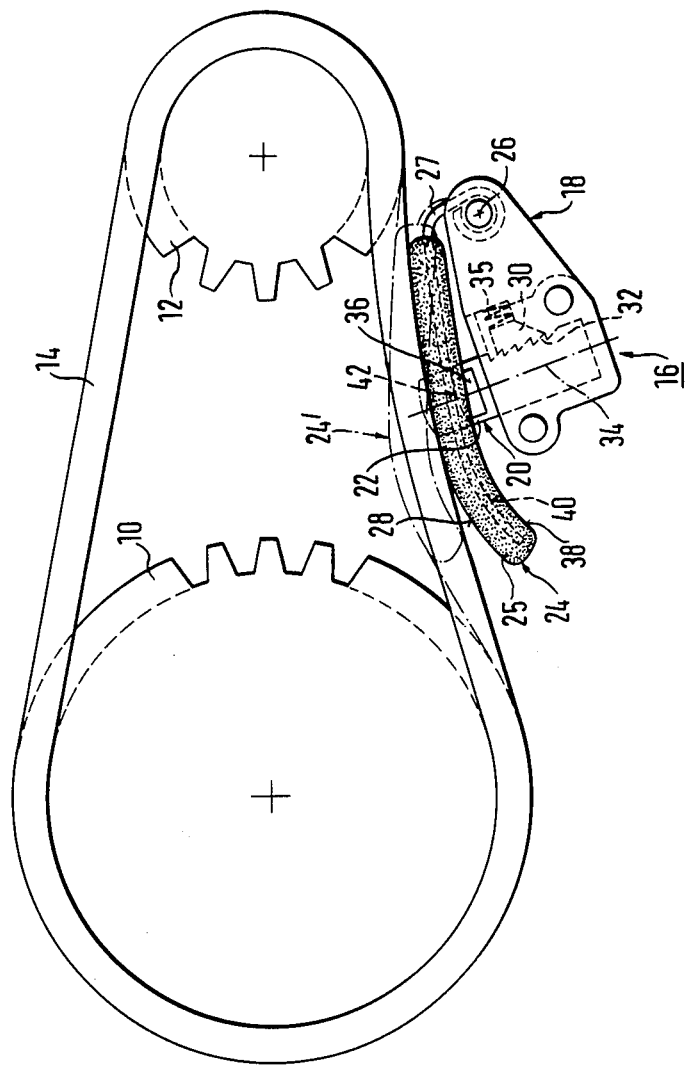
FIG. 1 shows a diagrammatic elevation of a chain tensioner according to the invention for tensioning a circulating chain.

In FIG. 1 there is seen an endless chain 14 running over a large toothed wheel 10 and a small toothed wheel 12, this chain is constantly tensioned in one of the two free zones between the toothed wheels 10 and 12 with the aid of the chain tensioner 16. A piston 20 guided axially displaceably in a guide housing 18 of the chain tensioner 16 presses with its piston head 22 against a tensioner bar 24 which again is pivotably mounted at one of its ends on the guide housing 18 (axis 26) and presses with its outside 28, remote from the piston, against the chain 14. On an elongation of the chain 14 the piston 20 presses the tensioner bar 24 correspondingly away from the guide housing 18 (dot-and-dash position 24' of the tensioner bar 24 in FIG. 1). The piston 20 is pressed by a helical compression spring (not shown) out of the guide housing 18, possibly with support by oil pressure. A ratchet prevents inward movements of the piston beyond a specific slight amplitude of inward movement. According to FIG. 48 of European Publication Specification No. 0,106,325 for this purpose a catch 30 indicated in FIG. 1 of the present application engages in a row of saw teeth 32 extending on the corresponding piston side parallel to the piston axis 34. An initial stressing spring 35 presses the catch 30 in the direction towards the tooth row 32. In the case of a rotation of the piston 20 about the piston axis 34 the catch effect would be eliminated as soon as the tooth row 32 comes out of engagement with the catch 30. This undesired rotation is prevented by the fact that the piston is flattened off on both sides with piston side faces 36 substantially parallel to the piston axis 34 and to the longitudinal direction of the tensioner bar. A guide groove 40 formed on the inner side 38 of the tensioner bar 24 grasps around the tensioner head 22 in such manner that the groove side faces parallel to the plane of the drawing in FIG. 1 rest on the piston side faces 36. In an outward movement of the piston 20 the rounded piston end face 42 slides along the bottom of the groove. By reason of the fitting of the piston head 22 into the groove firstly the desired lock against rotation for the piston 20 and nextly a lateral guidance for the tensioner bar 24 result, the tensioner bar 24 now being prevented from carrying out lateral pivoting movements (perpendicularly to the plane of the drawing in FIG. 1) about its pivot joint (pivot axis 26).

Figure 2:
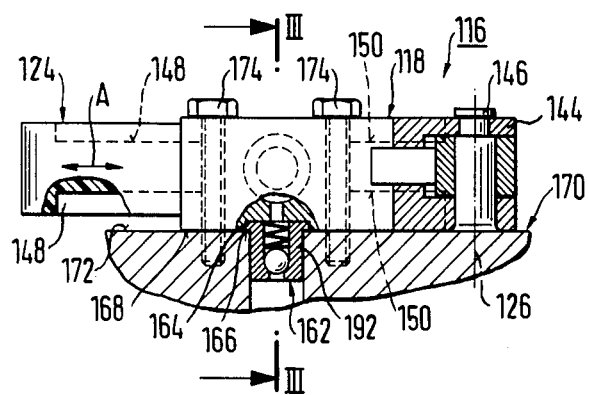
FIG. 2 shows a view from beneath of a slightly modified chain tensioner, partly in section along the line II—II in FIG. 4.
Figure 4:
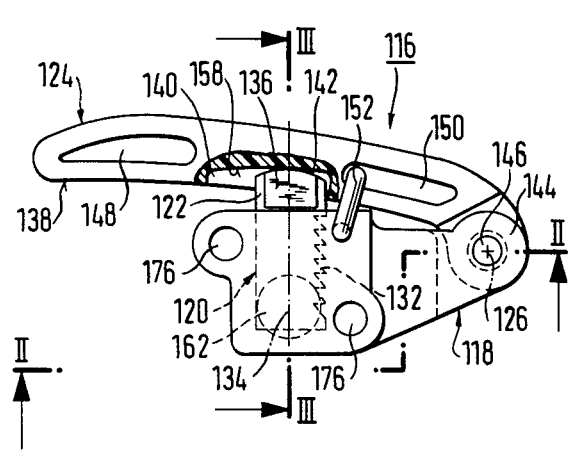
FIG. 4 shows a side view of the chain tensioner according to FIGS. 2 and 3.
Figure 3:
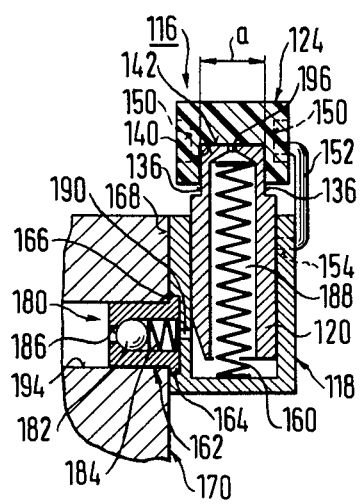
FIG. 3 shows a section along the line III—III in FIGS. 2 and 4.

In FIGS. 2 to 4 a further form of embodiment of a chain tensioner is illustrated in greater detail, where components corresponding in function to those in FIG. 1 are provided with the same reference numerals each increased by 100.

The chain tensioner correspondingly designated by 116 comprises a tensioner bar 124 moulded in one piece from synthetic plastics material, that is in contrast to the tensioner 16 where the tensioner bar 24 consists of a curved metal bar 27 articulated to the guide housing and covered except for the joint region with a synthetic plastics coating 25.

The tensioner bar 124 is pivotably mounted at its end on the right in FIGS. 2 and 4 in a bearing fork 144 of the guide housing 118 by means of a rivet bearing bolt 146 with bearing axis 126. According to FIG. 4 on the inside 138 of the tensioner bar 124 the guide groove 140 is formed which however extends only over that part of the length of the tensioner bar which is swept by the tensioner head in the possible positions of extension of the piston 120. In the remaining region the tensioner bar 124 is made solid throughout except for lateral longitudinal slots 148, 150 in the bar longitudinal direction A (FIG. 2) on both sides of the guide groove 140. The tensioner bar 124 accordingly is mechanically sufficiently stable with low consumption of material and correspondingly low weight. One of the two longitudinal lateral grooves 150 placed closer to the pivot joint (pivot axis 126) can receive one side leg of a U-shaped transport securing clip 152 for securing in transport, the other side leg of which is to be inserted in a corresponding bore 154 of the guide housing 118 (see FIGS. 3 and 4). The piston is then expediently situated in its retracted end position.

In conformity with the form of embodiment in FIG. 1, in that according to FIGS. 2 to 4 as well the piston head 122 is flattened off on both sides (piston side faces 136 in FIGS. 3 and 4) in adaptation to the width a of the guide groove 140 in the tensioner bar 124. The piston end face 142 like the bottom of the groove 158 is slightly domed, the latter with larger radius of curvature, in order to ensure a low-friction sliding of the piston end face 142 along on the groove bottom 158 in the outward movement of the piston 120. An initial stressing spiral spring 160, visible in FIG. 3 and inserted into the hollow cylindrical piston 120, presses the piston 120 outwards and thus the tensioner bar 124 against the chain, belt or the like (not shown). On its side closest to the pivot joint (pivot axis 126) the piston is provided with a tooth row 132 extending parallel with the piston axis 134, in which a catch (not shown in FIG. 4) engages in accordance with FIG. 1.

As FIGS. 2 and 3 show, an oil feed nipple 162 is fitted, especially pressed, into the guide housing 118 in such manner that a circumferential collar 164 of enlarged diameter of the oil feed nipple has its annular side 166 remote from the guide housing 118 flush with a guide housing side face 168. With this side face 168 the chain tensioner 116 lies flat on a corresponding chain tensioner fitting face 172 of a chain tensioner carrier 170 after fitting on this carrier has taken place. The securing of the guide housing 118 on the chain tensioner carrier 170 here takes place, independently of the oil feed nipple 162, by means of two headed screws 174 visible in FIG. 2 which, passing through passage holes 176 visible in FIG. 4, are screwed into the chain tensioner carrier 170.

The oil feed nipple 162 accommodates a non-return valve 180, which is formed for example by a valve ball 182 which is pressed by an initial stressing spring 184 against an entry opening 186 of the oil feed nipple 162.

In order to render oil access into the piston interior 188 possible even in the retracted end position of the piston, the piston 120 is bevelled off at its inner end in the region of the oil feed nipple 162 so that it does not cover the corresponding internal nipple opening 190.

In the fitting of the chain tensioner 116 on the chain tensioner carrier 170 the oil feed nipple 162 is inserted with a cylindrical insertion section 192 into a correspondingly adapted oil feed opening 194 of the chain tensioner carrier 170. After the mentioned headed screws 174 have been screwed tight both the said annular side 166 of the oil feed nipple 162 and the side face 168, flush therewith, of the guide housing lie flat on the chain tensioner fitting face 172 of the chain tensioner carrier 170. There is therefore no possibility of the oil feed nipple 162 slackening on the guide housing 118, for example by reason of vibrations and under the operating oil pressure, with the consequence of leakages. Moreover the oil pressure serves firstly to increase the outward thrust force of the piston 120 and also for lubrication, for which purpose an oil delivery opening 196 is provided in the end face 142 of the piston head 122. The non-return valve 180 reduces and damps inward vibrations of the piston 120.

Figure 5:
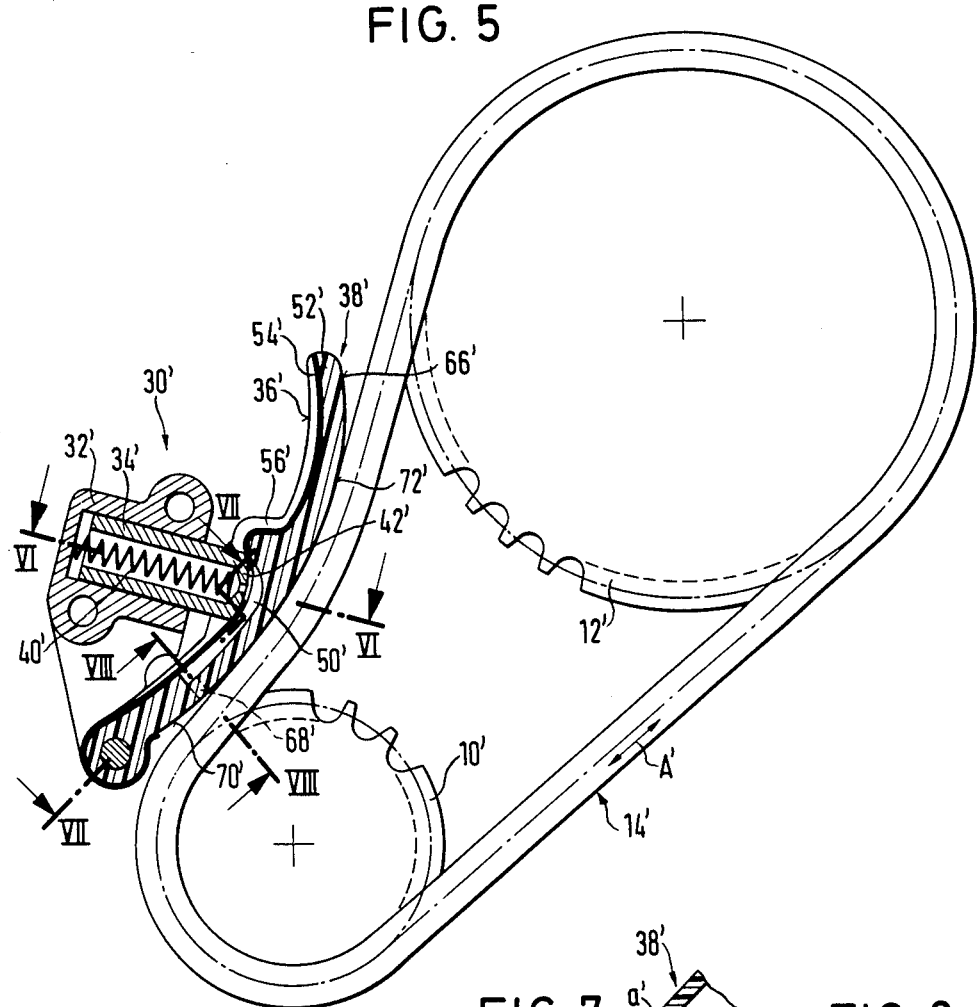
FIG. 5 shows a simplified lateral elevation in section of a further form of embodiment of the chain tensioner according to the invention with an indicated roller chain loop.
Figure 8:
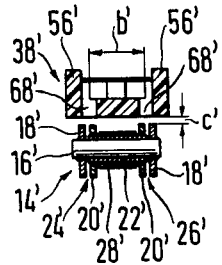
FIG. 8 shows a partial section along the line VIII—VIII in FIG. 5.

In FIG. 5 there is seen a roller chain 14', conducted in a closed loop over two reversing wheels 10' and 12', of usual assembly, that is of chain bolts 16' visible in FIG. 8, on each of the two ends of which outside side bars 18' are rigidly fitted, while in each case a sleeve 22' provided with corresponding internal side bars 20' is pushed on to the bolts 16' and inserted between the two outer side bars 18'. The side bars 18', 20' on each side of the chain, that is at one end of the bolts 16', are to be designated as side bar row, namely in FIG. 8 to the left side bar row by 24' and the right in FIG. 8 by 26'. Each side bar row thus consists of interconnected side bars offset overlappingly in relation to one another in the chain longitudinal direction A' and arranged directly beside one another in the transverse direction (outer side bar 18' and inner side bar 20' in alternation).

In the case of the roller chain 14' as illustrated, rollers 28' serving for friction reduction in circulation about the reversing wheels 10' and 12' are also pushed on to the sleeves 22'. In the case of a bushing chain these rollers 28' are omitted.

The invention is also applicable to multiple chains, especially double chains, where more than two side bar rows interconnected by sleeves or bolts are provided.

A chain tensioner designated generally by 30' ensures constant initial tensioning of the chain 14', compensating for any chain elongation.

Figure 6:
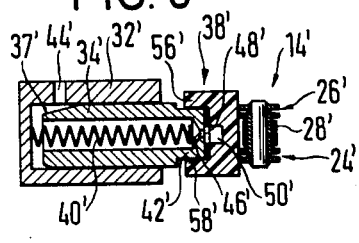
FIG. 6 shows a partial section along the line VI—VI in FIG. 5.

For this purpose the chain tensioner 30' consists of a non-displaceable housing 32' in which a hollow piston 34' is displaceably mounted. The hollow piston 34' presses against the interior 36' of an elongated curved tensioner arm 38' articulated with its one end to the housing 32'. An initial stressing spring 40' within the hollow piston 34' and bearing on one side on the piston end 42' lying outside the housing 32' and on the other side on the housing 32' initially stresses the hollow piston 34' in the direction towards the curved tensioner bar 38'. The initial stress force of the spring 40' can be supported by oil pressure which can build up between hollow piston and housing. In FIG. 6 there is seen an oil feed opening 44' in the housing 32' with connection to the interior of the hollow piston 34' (bevel 37 on the inner end of the hollow piston).

Independently of a possible supporting of the initial stressing spring 40', the oil supplied through the opening 44' to the tensioner 30' also serves for the lubrication of the chain 14'. For this purpose in the piston end 42' nearer to the tensioner bar there is provided a constricted oil outlet opening 46' which overlaps with a somewhat larger oil entry opening 48' of the tensioner bar 38' so that oil can enter a passage 50' within the tensioner bar 38'.

In order that the passage 50' can be formed within the tensioner bar 38' without major production expense, the curved tensioner bar 38' is made in two parts, namely the actual curved bar part 52' manufactured especially from synthetic plastics material and a cover part 54' in the form of a sheet metal strip resting on the inside of the curved bar part 52' facing the hollow piston 34', of which strip the lower end in FIG. 5 is bent around the lower end of the bar part 52' articulated to the housing 32' to improve cohesion. As shown by FIGS. 5, 6 and 8, two guide flanges 56' protruding in the direction towards the housing 32' extend on the bar part interior in the longitudinal direction on both edges, which flanges grasp the cover part laterally in and on each of which flanges a flattened side face 58' of the hollow piston 34' bears laterally, for mutual lateral guidance of tensioner bar 38' and hollow piston 34'.

Figure 7:
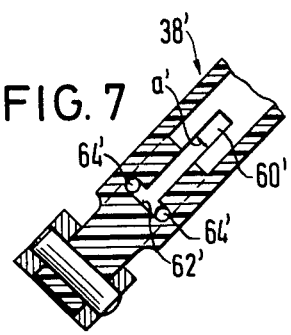
FIG. 7 shows a partial section along the line VII—VII in FIG. 5, without cover part.

Thus the closed passage 50' is formed by a groove 60' of rectangular cross-section extending in the longitudinal direction of the bar part 52' and visible in FIG. 7, the width a' of which groove corresponds to the corresponding dimension of the oil entry opening 46'. The groove 60' opens by way of a T-type groove widening 62' at the joint end of the groove, lower in FIG. 5, into two passage holes 64' penetrating the bar part 52', which form two oil outlet openings 68' on the exterior 66 of the curver bar. These oil outlet openings 68' lie in an area 70' of the curved bar exterior 66' which lies opposite to the roller chain 14' before it reaches the contact or abutment face 72' on the exterior 66' of the curved bar. The two oil outlet openings 64' are so oriented in the transverse direction in relation to the chain longitudinal direction A' on one line that they each lie opposite to one of the two side bar rows 24' and 26', as shown by FIG. 8. The distance b' in the transverse direction between the two oil outlet openings 68' accordingly corresponds to the spacing of the two side bar rows 24' and 26'. Thus the spacing is fixed in such a way that the oil issuing through the oil outlet openings 68' is sprayed or dripped exactly into the interspace region between outer and inner side bars 20' and 18' respectively of the respective side bar row 24' or 26'. This results in an optimum lubrication of the chain 14' (best lubrication result with minimum use of lubricant), since this said interspace region at the level of the respective bolt 16' is directly connected with the region to be lubricated between sleeve 22' and bolt 16'. The traction force of the chain is thus transmitted from the bolts 16' to the sleeves 22' and vice versa. On the other hand the lubrication of the region between the sleeves 22' and the rollers 28' is of lower importance, since firstly forces act between these parts only in the region of the reversing wheels 10', 12' and also the occurring surface loadings are correspondingly lower by reason of the larger diameter. In general the oil creeping by way of the inner side bars 20' into the region of the rollers 22' suffices for the lubrication of the rollers 22'.

Thus while the arrangement according to the invention is in use oil flows through the opening 44' into the housing 32' and into the hollow piston 34'. Through the opening 46' in the hollow piston and the opening 48' in the cover part 54' the oil passes into the groove 50' formed as pressure oil chamber. Since the hollow piston 34' abuts at the end under initial stress on the cover part 54', which is domed in conformity with the outward doming of the piston end 42', firstly a seal between hollow piston 34' and cover part 54' around the mutually overlapping openings 46' and 48' and nextly a seal between cover part 54' and curved bar part 52' result. Since the width a' of the groove amounts to only about one-third of the corresponding width of the cover part 54' and thus of the outer end of the hollow piston 34', the support area of the cover part 54' on both sides of the groove 50' is relatively large, so that the danger of deformation of the curved bar part 52' of synthetic plastics material is negligible.

The oil supplied through the groove 60' to the two oil outlet openings 68' drops or sprays (according to the selected oil pressure and the selected constricted cross-section of the opening 46') on to the roller chain 14' in each case on to one of the two side bar rows, so that the roller chain 14', running up on to the abutment face 72' almost immediately thereafter, both is well lubricated itself and also, by reason of lubrication of the side bars, runs with low friction and wear along the abutment face 72'. The short distance c' visible in FIG. 8 between the oil outlet openings and the chain, which corresponds approximately to the opening diameter, ensures that practically the whole of the delivered oil passes on to the chain without danger of soiling or even blockage of the oil outlet openings by dirt or abraded material from the chain.

I claim:

1. Chain tensioner comprising a housing (32'), an axially extending piston (34') displaceably guided in the axial direction of said piston in a recess in said housing (32'), an elongated tensioner bar (38') having a first end and a second end spaced apart in the elongated direction with the first end articulated to the housing (32'), said tensioner bar (38') has a first side (36') extending in the elongated direction and pressed against a piston head (42') of said piston (34') located externally of said housing (32'), said tensioner bar (38') has a second side (72') extending in the elongated direction and disposed opposite said first side (36') and said second side (72') rests against a chain (14'), and a device for lubricating the chain (14') having an oil entry aperture (48') in said first side (36') and at least one oil outlet aperture (68') in the second side (72') of said tensioner bar (38'), wherein the improvement comprises an oil feed opening (44') opening into the recess of said housing (32'), said piston (34') is a hollow piston in the axial direction forming an axially extending bore and an oil outlet opening (46') through said piston head (42') connected to said oil entry aperture (48'), said tensioner bar (38') has a passage (50') extending parallel to said second side (72'), and said passage (50') connects said oil entry aperture (48') with said at least one oil outlet aperture (68').

2. Chain tensioner according to claim 1, characterized in that on one of the piston head (22; 122) and tensioner bar (24; 124), there is formed a guide groove (40; 140) extending substantially parallel with the elongated direction (A) of the tensioner bar, in which groove there engages a guide protuberance formed on the other one of said piston head and tensioner bar.

3. Chain tensioner according to claim 2, characterized in that the external circumference of the piston head (22; 122) is flattened on at least one side with a piston side face (36; 136) substantially parallel to the elongated direction (A) of the tensioner bar and to the piston axis (34; 134), which side face abuts on a groove side face of the tensioner bar (24; 124).

4. Chain tensioner according to claim 3, characterized in that the pivot bearing between tensioner bar (24; 124) and guide housing (18; 118) comprises a bearing fork (114) formed on one of the guide housing (18; 118) the tensioner bar.

5. Chain tensioner according to claim 2, characterized in that the tensioner bar (24; 124) is formed with synthetic plastics material.

6. Chain tensioner according to claim 1, characterized in that an oil feed nipple is inserted into the guide housing and comprises a push-in section for pushing into an oil feed opening of a chain tensioner carrier, the push-in section (190) comprising at least one radical protuberance for abutment on a chain tensioner fitting face (172), surrounding the oil feed opening (194), of the chain tensioner carrier (170).

7. Chain tensioner according to claim 6, characterized in that the at least one radial protuberance is formed by a peripheral collar (164) of enlarged diameter of the push-in section (190).

8. Chain tensioner according to claim 7, characterized in that the peripheral collar (164) is flush with a guide housing side face (168) lying opposite to the chain tensioner fitting face (172).

9. Chain tensioner according to claim 6, characterized in that the oil feed nipple (162) is pressed into the guide housing (118).

10. Chain tensioner according to claim 2, characterized by a transport securing clip (152) connecting the guide housing (118) with the tensioner bar (124) in an inward end position of the piston (120).

11. Chain tensioner according to claim 1, wherein said chain (14') is a link chain and travels in the elongated direction of said tensioner bar and bears against said second side (72') of said tensioner bar (38'), said link chain (14') is formed with at least two rows of side bars (24', 26') extending in the travel direction (A') of said link chain and said side bars are interconnected by bolts (16') and sleeves (28') extending transversely to the travel direction, each of said rows of side bars comprising side bars (18', 20') offset in overlapping manner in relation to one another in the link chain travel direction (A') and disposed side-by-side in the transverse direction and interconnected in an articulated manner, so that at the second side (72') a quantity of oil exists through oil outlet apertures (68') to the number of side bar rows (24', 26'), with each of said oil outlet apertures (68') located opposite one of said side bar rows (24', 26').

12. Chain tensioner according to claim 11, characterized in that said oil outlet apertures (68') are arranged in a surface area (70') of said second side (72') of said tensioner bar (38') facing toward said link chain (14') at a location upstream from a position where the link chain (14') contacts said second side (72') as said link chain moves in the travel direction (A').

13. Chain tensioner according to claim 1, characterized in that the passage (50') is designed as a pressure channel.

14. Chain tensioner according to claim 13, characterized in that said tensioner bar (38') includes a cover part (54') covering a groove (60') formed in said first side (36'), said cover part is provided in the region of said oil supply aperture (46') of said hollow piston (34') with said oil inlet aperture (48') communicating with said groove (60'), and said oil inlet aperture (48') being enlarged in the elongated direction of said tensioner bar.

15. Chain tensioner according to claim 14, characterized in that the head (42') of said hollow piston (34') bears against said cover part (54').

16. Chain tensioner according to claim 15, characterized in that said cover part (54') has a surface facing said piston head (42') corresponding to the surface of said piston head.

17. Chain tensioner according to claim 16, characterized in that the width (A') of said groove (60') in the region of said oil inlet aperture (48') corresponds to the similarly oriented dimension of said oil inlet aperture (48') and said groove (60') widens in the width direction only in the region of at least two said oil outlet apertures (68').

18. Chain tensioner according to claim 14, characterized in that guidance flanges (56') extending in the elongated direction of said tensioner bar (38') are located along said first side (36') and said guidance flanges rest against opposite sides of said hollow piston (34') with said cover part (54') located between said guidance flanges.

* * * * *